Figure 1:
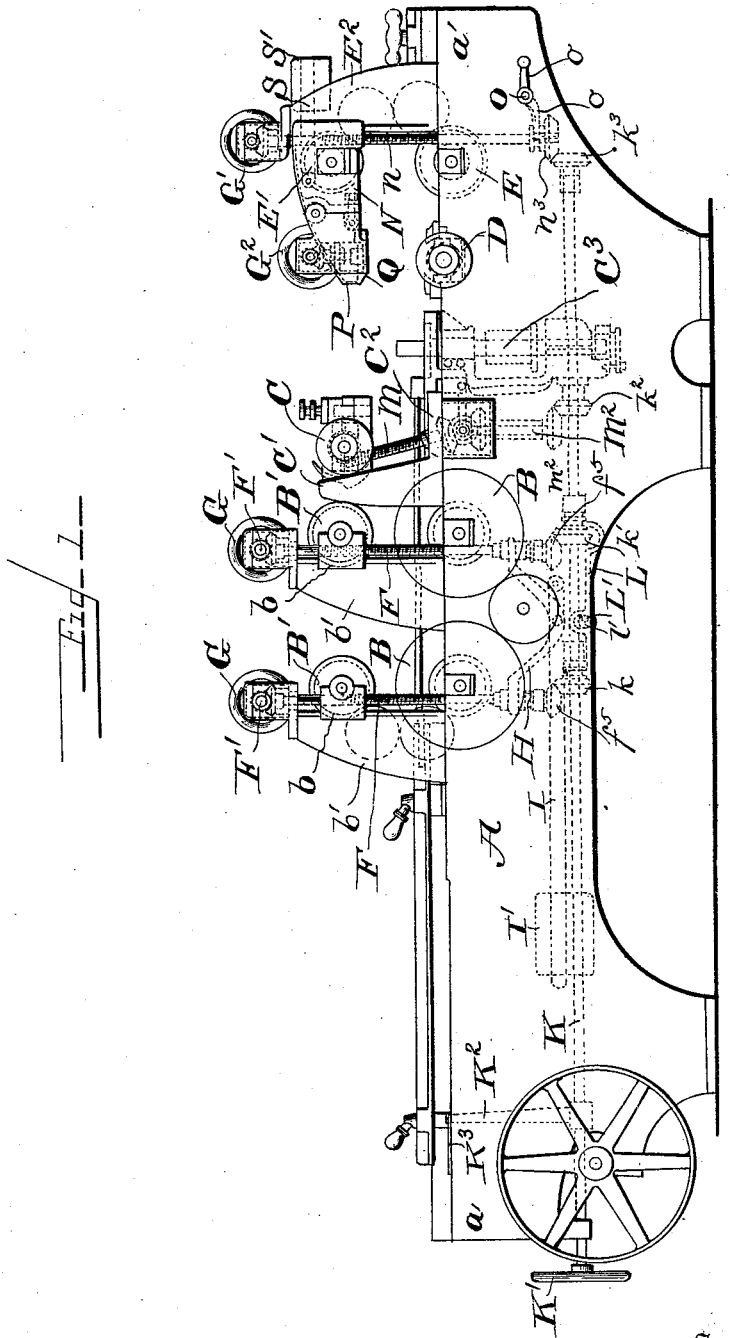

(No Model.) 6 Sheets—Sheet 1.

W. H. DOANE.
PLANING MACHINE.

No. 477,928. Patented June 28, 1892.

Witnesses
G. A. Tauberschmitt.
J. D. Kingsbury.

Inventor
William H. Doane
By Whitaker & Prevost Attorneys.

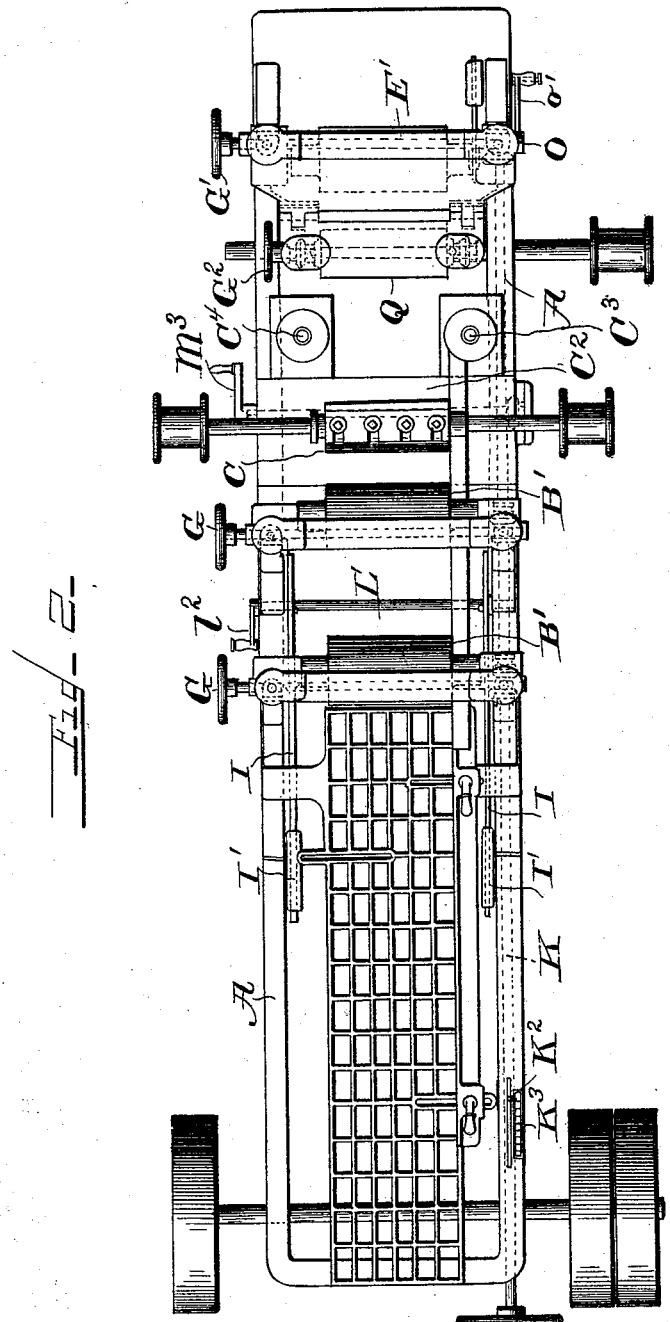

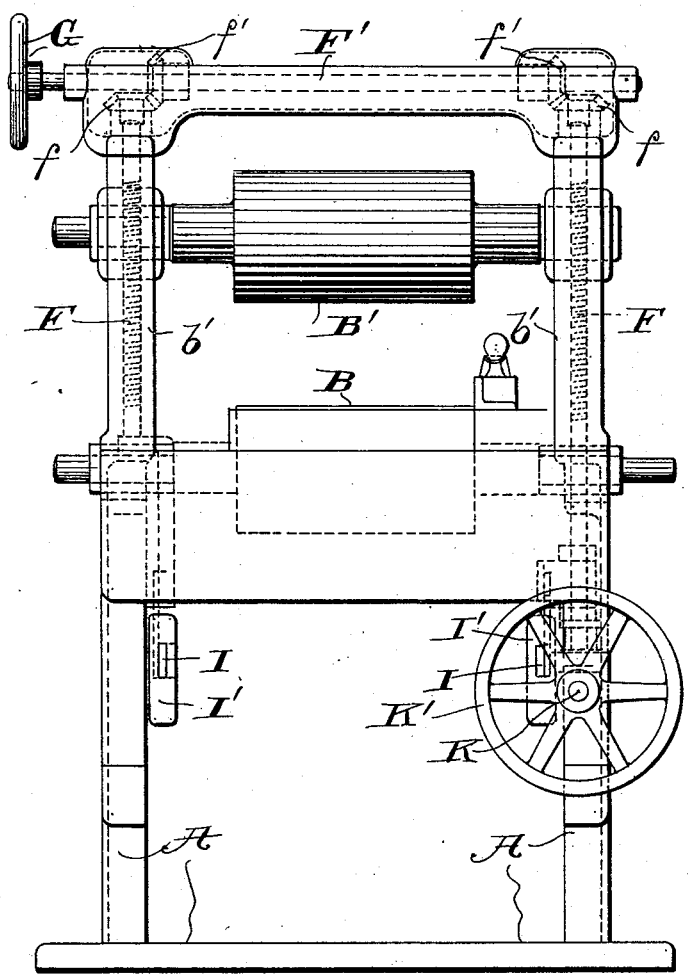

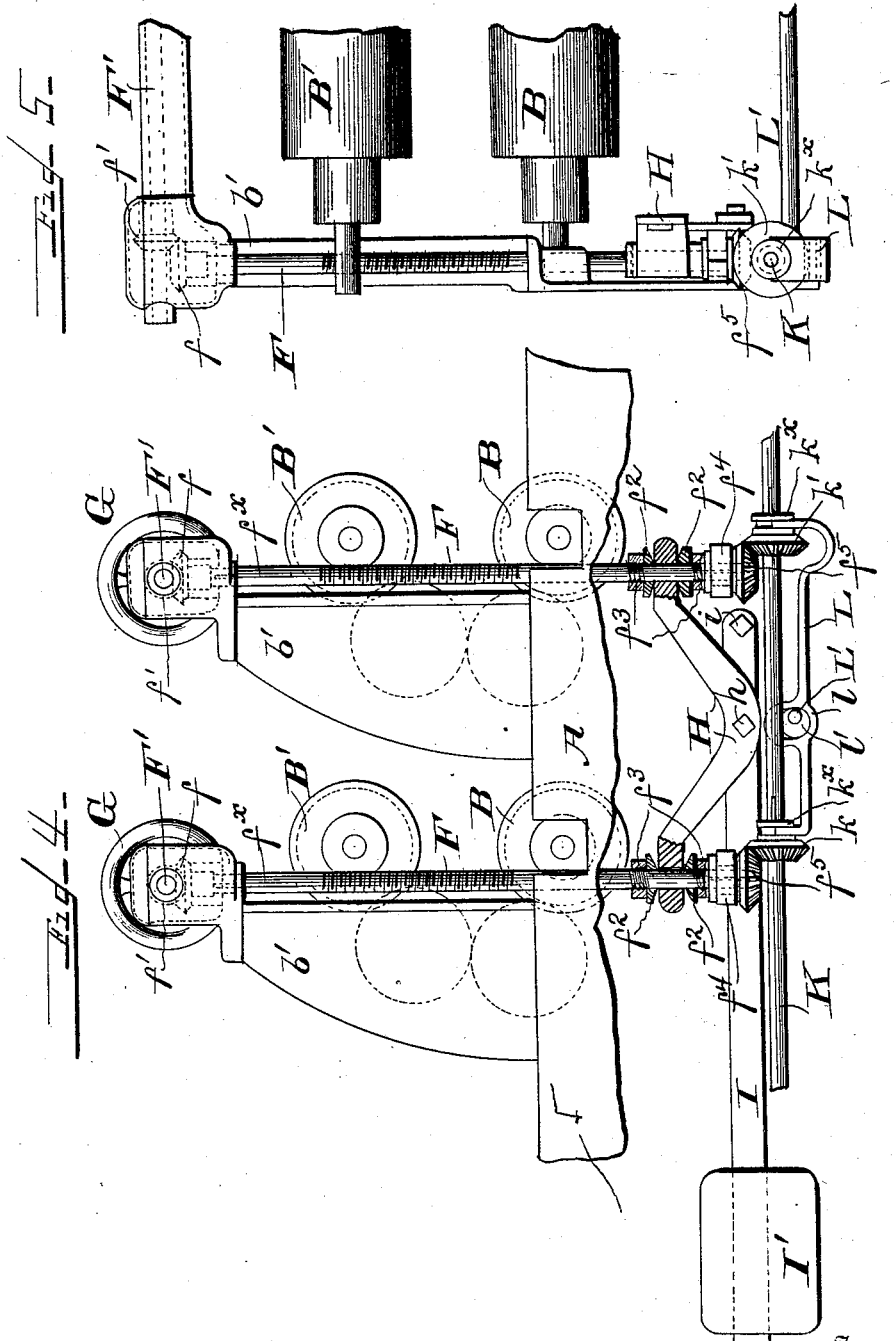

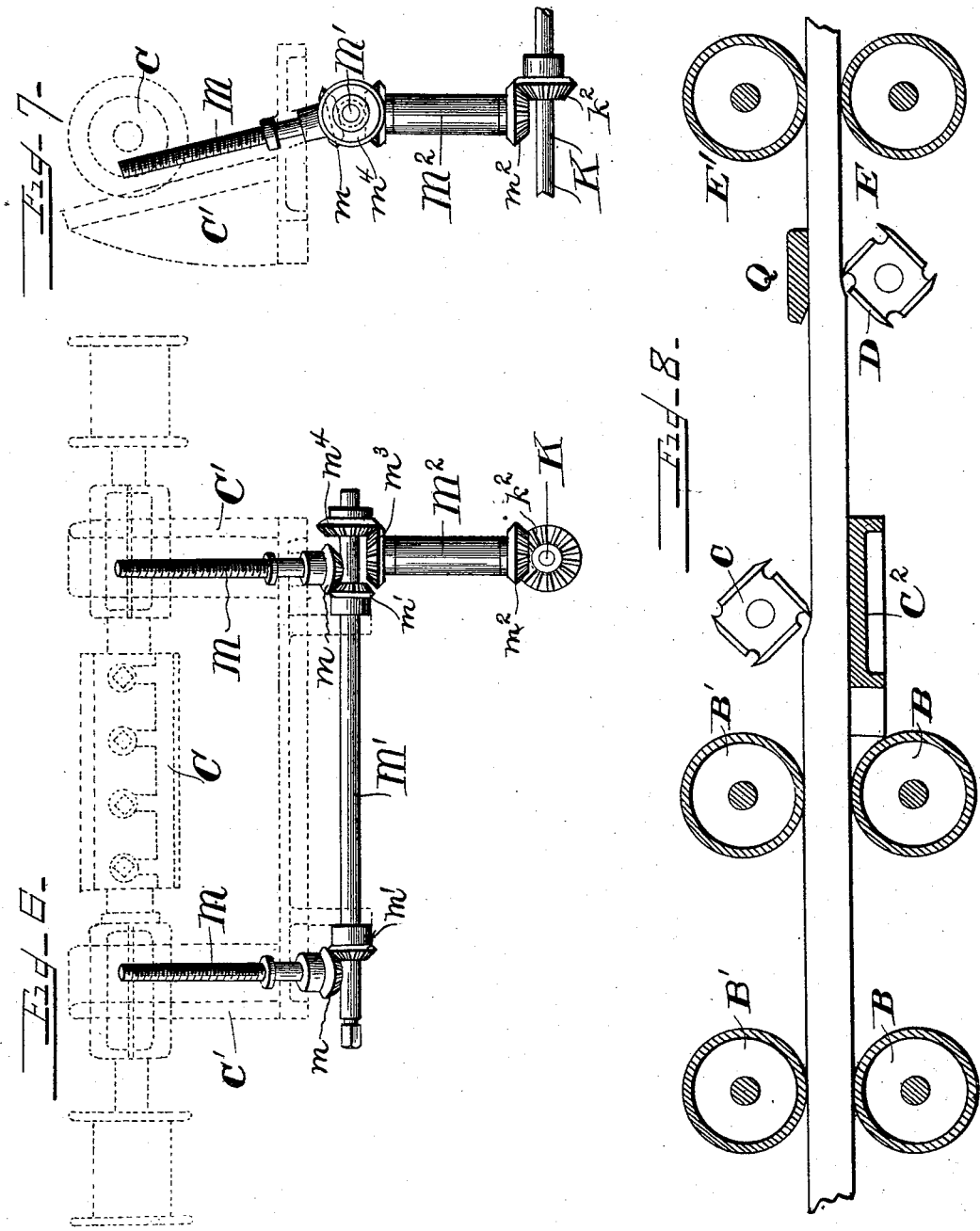

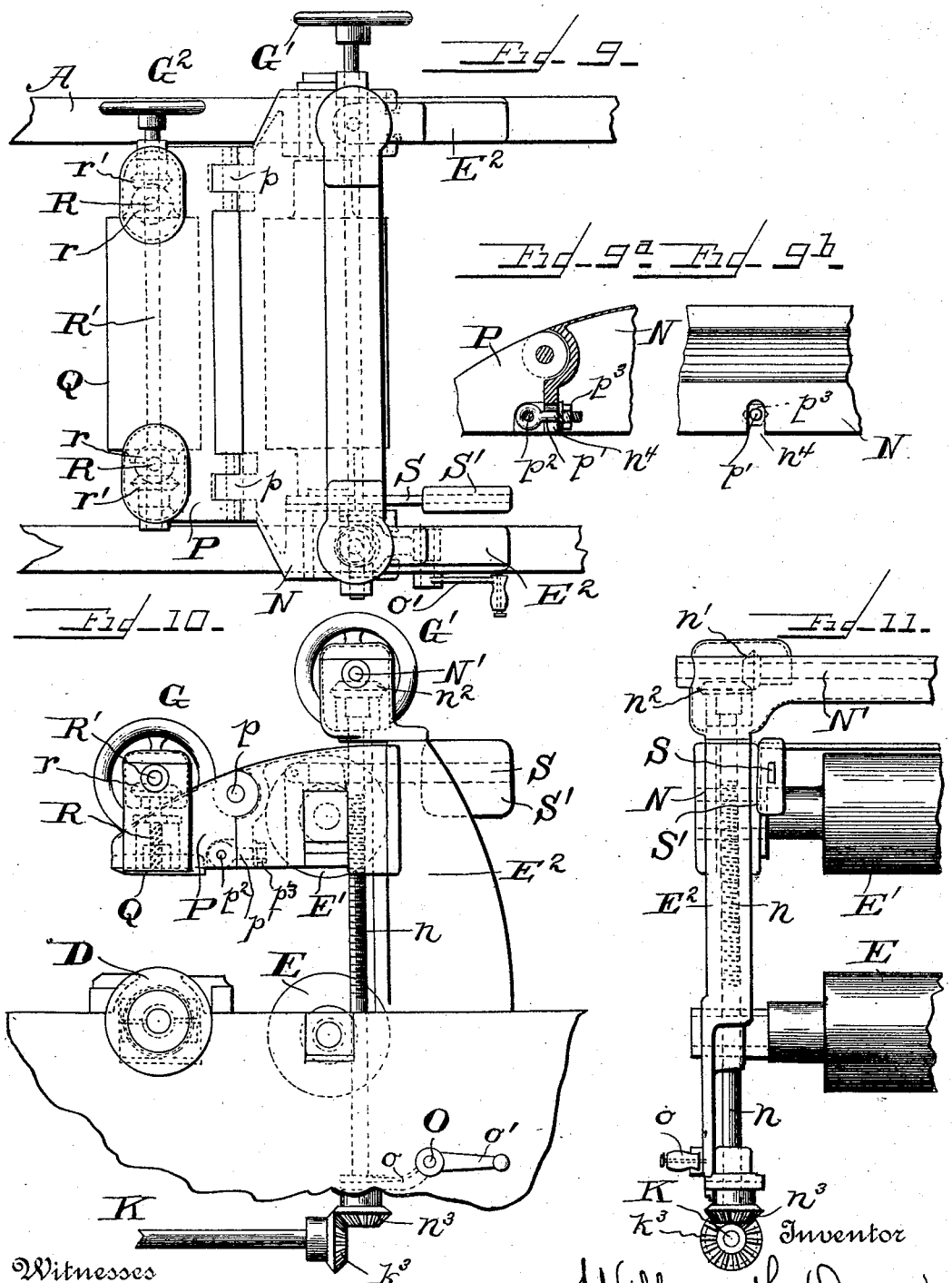

UNITED STATES PATENT OFFICE.

WILLIAM H. DOANE, OF CINCINNATI, OHIO.

PLANING-MACHINE.

SPECIFICATION forming part of Letters Patent No. 477,928, dated June 28, 1892.

Application filed August 13, 1891. Serial No. 402,498. (No model.)

*To all whom it may concern:*

Be it known that I, WILLIAM H. DOANE, a citizen of the United States, residing at Cincinnati, in the county of Hamilton and State of Ohio, have invented certain new and useful Improvements in Planing-Machines; and I do hereby declare the following to be a full, clear, and exact description of the invention, such as will enable others skilled in the art to which it appertains to make and use the same.

My present invention is an improvement in planing-machines; and it consists in the novel features of construction hereinafter fully described.

I have illustrated one form in which I have contemplated embodying my invention in the accompanying drawings, and the said invention is fully disclosed in the following description and claims.

Referring to the said drawings, Figure 1 is a side elevation of a planing-machine embodying my invention. Fig. 2 is a top plan view of the same. Fig. 3 is an elevation, slightly enlarged, showing the feeding-in end of the machine. Figs. 4 and 5 are detail views of mechanism for adjusting the feeding-in rollers. Figs. 6 and 7 are detail views of the mechanism for adjusting the upper planing-cylinder. Fig. 8 is a detail showing the relative positions of the feeding-in rollers, upper and lower planing-cylinders, the presser-bar over the lower cylinder, and the feeding-out rollers, showing the surfaces of the board engaged by each. Figs. 9, 9$^a$, 9$^b$, 10, and 11 are detail views showing the mechanism for adjusting the presser-bar over the lower planing-cylinder and the feeding-out rollers.

The object of my invention is to provide mechanism for simultaneously adjusting the feeding-in rollers, the upper planing-cylinder, the presser-bar over the lower cylinder, and the feeding-out rollers, to produce a board of the desired thickness, and at the same time to provide means for adjusting each of the above-mentioned parts independently. I have shown and shall describe so much of a roller-feed planing-machine as will clearly illustrate the application of my invention thereto, certain minor details of the construction of such machine being omitted in the drawings and description where the same are not necessary to be described for a complete understanding of my invention.

Referring to the accompanying drawings, A represents the frame-work of a feed-roller planing-machine, *a* being the feeding-in end of the machine, and *a'* the delivery or discharge end of the machine. B B are the lower feeding-in rollers, mounted in suitable bearings secured rigidly in the frame A of the machine. D is the lower planing-cylinder, and E the lower feeding-out roller, both of said devices being also mounted in fixed bearings in the frame A.

Above the lower feeding-in rollers B B are located the upper feeding-in rollers B' B', mounted in bearings *b b*, adapted to slide vertically on suitable supports *b' b'*, secured to the main frame A of the machine. The bearings *b b* are provided with screw-threaded apertures which are engaged by vertically-disposed screw-shafts F F, having their upper extremities mounted in bearings provided near the top of standards or supports *b' b'*. The upper ends of the said screw-shafts F F are provided with bevel-gears *ff*, and the pair of shafts F F, engaging the opposite bearings of each roller, are connected for joint operation by a counter-shaft F', having bevel-gears *f' f'*, mounted thereon and meshing with the bevel-gears *ff* on the worm-shaft. One end of each shaft F' is provided with a hand-wheel G or other operating device, by means of which either of the rollers B' B' may be independently adjusted vertically, as will be readily understood. (See Figs. 1 to 5, inclusive.)

The lower ends of the screw-shafts F F are provided below the plane of the lower feeding-in rollers B B with collars $f^2 f^2$, held against movement longitudinally of said shaft by suitable nuts $f^3 f^3$ and having their inner faces preferably convex, as indicated in the drawings, to engage the ends of a yoke H, as clearly shown in Figs. 1 and 4. The yoke H is pivotally connected at *h* with a lever I, which is connected to the frame A of the machine at *i* and has its opposite ends provided with a weight I'. It will thus be seen that the upper feeding-in rollers B' B' when they are raised slightly by the feeding-in of an unplaned board will raise the weight I' through the intervention of the collars $f^2 f^2$ and yoke H. It will be understood that the shafts F F at each side of a machine will be connected with a yoke H and weighted lever, as before described, thus enabling the feeding-in rollers to accommodate themselves to slight inequalities in the surface of the material to be planed. As the shafts F F must be permitted a slight movement in a vertical direction, the bevel-gears $f f$ will be so mounted upon the screw-shafts as to permit said shafts to move longitudinally with respect to said gears, the said gears being secured to rotate with said shafts by a spline or feather, as indicated at $f^\times$ in Fig. 4. The lower extremities of the shafts F F are journaled in bearings $f^4 f^4$, secured to the frame of the machine, and are provided with bevel-gears $f^5 f^5$ at one side of the machine, which are splined on said shafts so as to turn therewith, but permit the vertical longitudinal movement of said shafts. The yoke H forms what I term an "evening connection" between the weighted lever and the screw-shafts F F.

A horizontal shaft K extends longitudinally of the machine-frame A at one side of the same and is supported in suitable bearings provided for it and secured to the said main frame. This shaft K is provided with bevel-gears $k k'$, adjacent to the bevel-gears $f^5 f^5$ on the lower end of the shafts F F, located at that side of the machine, the said gears $k k'$ being mounted to rotate with the shaft K, but capable of being moved longitudinally of said shaft into and out of mesh with the bevel-gears $f^5 f^5$. This is preferably accomplished by securing said gears $k k'$ to the shaft K by means of splines or feathers. The gears $k k'$ are provided with grooved hubs $k^\times k^\times$, said grooves being engaged by opposite ends of a yoke L, provided adjacent to its center with a slotted portion $l$. An eccentric $l'$ on a counter-shaft L' engages the slotted portions $l$ of the yoke, and said counter-shaft L' is provided, preferably on the working side of the machine, with a crank or hand-wheel $l^2$, a crank being shown by means of which the counter-shaft L' can be revolved and the gears $k k'$ moved into and out of mesh with the gears $f^5 f^5$ of the screw-shafts F F. The longitudinally-extending shaft K is provided with a hand-wheel K' at the feeding-in end of the machine, and it will be observed that the upper feeding-in rollers can be adjusted simultaneously by turning the shaft K when the gears $k k'$ are in mesh with the gears $f^5 f^5$, while at the same time by throwing the gears $k k'$ out of engagement with the gears $f^5 f^5$ the said feeding-in rollers can be independently adjusted by means of the hand-wheels G G.

C is the upper planing-cylinder, the bearings of which are supported upon inclined faces of standards C' C', secured to the frame of the machine, said bearings being adapted to slide upon said inclined faces to adjust the cylinder C in a vertical direction. The bearings of cylinder C are provided with screw-threaded apertures which are engaged by the inclined screw-shaft M M, which are journaled in suitable bearings provided in the lumber-supporting bed-plate $C^2$, as shown in the drawings of the machine, and are provided on their lower ends with bevel-gears $m$. The screw-shafts M M are connected for joint operations by a counter-shaft M', having bevel-gears $m' m'$ thereon, meshing with the gears $m m$ of the screw-shafts. Motion is imparted to the counter-shaft M' and the screw-shafts connected therewith by means of a vertically-disposed shaft $M^2$, which receives motion from the longitudinally-extending shaft K by means of a bevel-gear $k^2$ on said shaft K, which engages the gear $m^2$ on the shaft $M^2$. The connection between shafts M' and $M^2$ is made by means of a bevel-gear $m^3$ on shaft $M^2$, which engages a bevel-gear $m^4$ on the counter-shaft M'. The counter-shaft M' is also provided on the working side of the machine with an operating-crank or hand-wheel, a crank $M^3$ being shown, by means of which the said counter-shaft M' may be operated independently to adjust the planing-cylinder C when desired. If found desirable, the counter-shaft M' may be disconnected from the longitudinal shaft K when the cylinder is to be adjusted independently, and this may be accomplished in any desired way. For example, the shaft M' might be moved longitudinally far enough to disengage the gear $m^4$ from the gear $m^3$ on the vertically-disposed shaft $M^2$, the gears $m'$ being splined on the shaft to admit of this movement.

E' represents the upper feeding-out roller of the machine, which is mounted in a supporting-frame N, secured to and adapted to slide vertically upon the supporting-standards $E^2 E^2$, secured to the frame of the machine. The said supporting-frame N is provided with a pair of vertical screw-shafts $n n$ for adjusting said frame vertically, said shafts being connected for joint movement by a counter-shaft N', having gears $n' n'$ thereon meshing with gears $n^2 n^2$ on the upper extremities of the screw-shafts $n n$. The counter-shaft N' is also provided with a hand-wheel G' for operating the same and independently adjusting the supporting-frame N and upper feeding-out roller E'. The lower end of one of the shafts $n$ (the one adjacent to the side of the machine at which the longitudinal shaft K is located) is provided with a bevel-gear $n^3$, which engages or is adapted to engage a bevel-gear $k^3$, secured upon the longitudinal shaft K. The gear $n^3$, while secured to turn with the screw-shaft $n$, is capable of movement longitudinally thereof. The hub of the gear $n^3$ is provided with a peripheral groove, which is engaged by one end of a forked lever $o$, secured to rock-shaft O and having an operating-crank $o'$ at one side of the machine for turning said shaft and moving the gear $n^3$ into and out of engagement with the gear $k^3$ on the longitudinal shaft K. It will thus be seen that by turning the shaft K by means of hand-wheel K' at the feeding-in end of the machine the upper feeding-in rollers, the upper planing-cylinder, and the upper feeding-out roller and its supporting-frame can all be adjusted simultaneously, and also each of said parts may be adjusted independently when desired.

To the supporting-frame N is pivotally connected the supports P for the presser-bar over the lower cylinder, the two parts being connected by a hinged joint at $p\ p$. I prefer to hinge these parts together in order that the presser-bar may be thrown up out of the way when desired to give access to the lower planing-cylinder for sharpening or adjusting the knives or for any other purpose.

In order to secure the supports P and presser-bar Q in operative position, I provide the supports P with a connecting-bolt $p'$, pivotally connected thereto at $p^2$ and adapted to engage a slot $n^4$ in a supporting-frame N. The bolt $p'$ is provided with a nut $p^3$, which may be turned up to secure the two parts N and P firmly together with the presser-bar Q in its operative position above the lower planing-cylinder.

The presser-bar Q is provided with a pair of adjusting screw-shafts R, provided at their upper extremities with gears $r$. The said screw-shafts R are connected for joint movement by a counter-shaft R', having gears $r'$, secured thereon and meshing with the gears $r$ of the screw-shafts. The counter-shaft R' is provided with a hand-wheel $G^2$ for operating the same to adjust the presser-bar Q with respect to its supports P and the frame N, which supports the upper feeding-out roller E'. It will thus be seen that while the frame N, carrying the roller E', is adjustable by means of the longitudinal shaft K from the feeding-in end of the machine or independently by means of the hand-wheel G' the presser-bar Q is not only adjusted by the movements of said frame N, but it has an independent adjustment with respect to said frame by means of the hand-wheel $G^2$ and connected mechanism. I also provide means for permitting the upper feeding-out roller E' to yield slightly in a vertical direction, and this may be accomplished by means of a weighted lever, as shown in Fig. 10, or by spring-pressure or in any other preferred manner. As shown in the drawings, the roller E' has a slight range of movement in a vertical direction with respect to the frame N and is held down by the weighted lever S; but I may connect the weight S' to the screw-shafts $n\ n$ in the manner shown in connection with the feeding-in rollers.

The parts of a feed-roller planing-machine which are not referred to in this description are not necessary to a complete understanding of my present invention.

The several parts of the machine hereinbefore mentioned may be connected for operation with a suitable power-shaft, and any system of gearing may be employed which is found most desirable.

It will be seen from the foregoing description that the lower feeding-in rollers, the lower planing-cylinder, and the lower feeding-out roller have fixed positions in the main frame of the machine, while the upper feeding-in rollers, the upper planing-cylinder, the presser-bar over the lower planing-cylinder, and the upper feeding-out roller are movable with respect to the part beneath them. It will also be seen that all of said parts can be adjusted vertically simultaneously from the feeding-in end of the machine by means of a single operating-shaft K, which is common to the adjusting mechanisms of all of said movable parts and which may be turned by the hand-wheel K' to quickly adjust the machine to plane boards of the desired thickness. The said movable parts, in addition to the means for simultaneous adjustment, are each provided with individual adjusting devices for raising and lowering each of said parts independently of the others, when desired. I also prefer to provide the shaft K with a projection or pointer $K^2$, adapted to engage an indicator-scale $K^3$, located adjacent to the feeding-in end of the machine, so that the operator can set the movable parts with the utmost accuracy. In using this scale the parts are disconnected from the shaft K, and by their independent adjusting devices the machine is accurately set, for instance, so that it will turn out boards of one inch thickness. The hand-wheel and shaft K are then turned until the pointer $K^2$ is at the one-inch mark of the scale $K^3$, and the various parts of the machine are then connected with the shaft K. The marks on the scale are so arranged that if the shaft K is turned until the pointer indicates one and one-half inches the parts will have been simultaneously adjusted to plane boards to one and one-half inches in thickness, and in the same manner, the parts having been once set in relation to the shaft K and scale $K^3$, they can be simultaneously adjusted by reference to said scale to plane boards to any desired thickness.

In Fig. 8 I have shown a diagrammatic view illustrating the course of a board in passing through the machine and showing the surfaces engaged by the different parts for the clear understanding of the relation of such parts.

Beneath the upper planing-cylinder is the fixed bed-plate $C^2$, over which the lumber passes as it is fed into the machine. (See Figs. 1, 2, 4, 5, and 8.) This bed-plate is rigidly supported by the frame-work of the machine and receives the thrust or cutting blows of the upper planing-cylinder. By employing a rigid bed-plate there will be no sagging of the lumber beneath the cylinder, and the work produced is more accurate and uniform. The upper planing-cylinder is adjusted toward and from the rigid bed-plate $C^2$ by the devices and in the manner before described.

In Figs. 1 and 2 I have shown the matcher-arbors $C^3$ $C^4$ suitably located in the main frame at opposite sides of the travel of the lumber, the matcher-heads being removed from the arbors to prevent confusion.

The matcher-arbors are mounted in any suitable or desired manner and are adapted to tongue and groove the lumber as it passes through the machine and while its upper and lower faces are being planed.

I do not desire to be limited to the exact details of construction herein shown and described, as slight variations may be made in the construction of the same without departing from the spirit of my invention.

What I claim, and desire to secure by Letters Patent, is—

1. A feed-roller planing-machine having upper and lower feed-rollers, upper and lower cutting-cylinders, and a presser-bar over the lower cylinder, independent mechanisms for raising the upper feed-rollers, the upper cutting-cylinder, and the presser-bar over the lower cylinder, a common shaft extending into proximity to and operatively connected with each of said mechanisms, and means for operating said shaft, substantially as described.

2. A feed-roller planing-machine having upper and lower feed-rollers, upper and lower cutting-cylinders, and a presser-bar over the lower cylinder, independent mechanisms for raising the upper feed-rollers, the upper cutting-cylinder, and the presser-bar over the lower cylinder, a common shaft extending into proximity to and operatively connected with each of said mechanisms, means for operating said shaft, and means for disconnecting each of said mechanisms and operating the same independently, substantially as described.

3. In a feed-roller planing-machine, the combination, with the upper feed-rollers, the presser-bar, and their bearings, of a pair of screw-shafts for each roller and for the presser-bar, the screws of each pair being operatively connected, and a common shaft extending into proximity to and operatively connected with the one of each pair of screw-shafts, substantially as described.

4. In a feed-roller planing-machine, the combination, with the lumber-supporting bed-plate of the upper planing-cylinder, of a pair of inclined screw-shafts journaled in and supported by said bed-plate, a cross-shaft connecting said screw-shafts beneath said bed-plate, a vertical shaft for imparting motion to said cross-shaft, and means for actuating said vertical shaft, substantially as described.

5. In a feed-roller planing-machine, the combination, with the lower planing-cylinder, of the upper feeding-out roller and the supporting-frame therefor, the presser-bar and its supports, said supports being connected to the frame of the feeding-out roller by horizontal pivots, and means for securing said presser-bar in position above said planing-cylinder, whereby said presser-bar may be released and turned on its pivots to remove it from above the planing-cylinder, said presser-bar moving within the planes of the sides of the machine, substantially as described.

6. In a feed-roller planing-machine, the combination, with the upper feeding-in rollers, of a pair of screw-shafts for each of said rollers for adjusting said rollers vertically, a weight at each side of the machine connected with one of each pair of screw-shafts by an evening connection, and means for simultaneously turning said shafts to adjust said rollers, whereby each one of each pair of screw-shafts is permitted to move independently against the tension of said weight, substantially as described.

7. In a feed-roller planing-machine, the combination, with the upper feeding-in rollers, of screw-shafts for raising and lowering the bearings of said rollers, comprising a pair of shafts for each roller connected for joint operation, said screw-shafts being movable vertically, a yoke connecting the shafts at each side of the machine, a weight connected with said yoke, and means for simultaneously turning the screw-shafts at one side of the machine to adjust said roller-bearings, substantially as described.

8. In a feed-roller planing machine, the combination, with the feeding-in rollers, of the screw-shafts for adjusting said rollers vertically, comprising a pair of shafts for each roller connected for joint movement, weights connected with said shafts, gears mounted to turn with said shafts but capable of sliding thereon, and a shaft provided with gears meshing with the gears on said screw-shafts for turning the same to adjust said rollers, substantially as described.

9. In a feed-roller planing-machine, the combination, with the feeding-in rollers, of the screw-shafts for adjusting said rollers vertically, comprising a pair of shafts for each roller connected for joint movement, one shaft of each pair being provided with a gear, a shaft provided with driving-gears mounted to revolve therewith but capable of moving longitudinally thereof, and means for moving said driving-gears into and out of mesh with the gears of the worm-shafts, substantially as described.

10. In a feed-roller planing-machine, the combination, with the feeding-in rollers, of screw-shafts for adjusting said rollers vertically, comprising a pair of said shafts for each roller connected for joint movement, a gear on one shaft of each pair, a shaft provided with driving-gears mounted to turn with said shaft but movable longitudinally thereof, a yoke connecting said driving-gears, and a shaft provided with an eccentric engaging said yoke for moving said driving-gears into and out of mesh with the gears of the driving-shaft, substantially as described.

11. In a feed-roller planing-machine, the combination, with the upper planing-cylinder, the fixed bed-plate, upper and lower feeding-rollers, the lower planing-cylinder, and presser-bar mounted above the same, of a single continuous shaft for simultaneously or independently adjusting said upper feed-rollers, upper cylinder, and presser-bar, and the matchers located adjacent to the travel of the lumber through the machine, substantially as described.

In testimony whereof I affix my signature in presence of two witnesses.

WILLIAM H. DOANE.

Witnesses:
WINSLOW N. YORK,
I. F. DOANE.